US011880167B2

(12) United States Patent
Geiser et al.

(10) Patent No.: US 11,880,167 B2
(45) Date of Patent: Jan. 23, 2024

(54) SEALING DEVICE

(71) Applicant: MECO SA, Grenchen (CH)

(72) Inventors: Samuel Geiser, Bienne (CH); Rémy Thiry, Les Bréseux (FR); Hervé Avril, Les Breuleux (CH); Julien Bonenfant, Bienne (CH)

(73) Assignee: MECO SA, Grenchen (CH)

( * ) Notice: Subject to any disclaimer, the term of this patent is extended or adjusted under 35 U.S.C. 154(b) by 245 days.

(21) Appl. No.: 17/320,781

(22) Filed: May 14, 2021

(65) Prior Publication Data

US 2021/0389728 A1 Dec. 16, 2021

(30) Foreign Application Priority Data

Jun. 10, 2020 (EP) .................................... 20179344

(51) Int. Cl.
*G04B 37/08* (2006.01)

(52) U.S. Cl.
CPC .................................. *G04B 37/088* (2013.01)

(58) Field of Classification Search
CPC ............................ G04B 37/103; G04B 37/088
See application file for complete search history.

(56) References Cited

U.S. PATENT DOCUMENTS

| | | | | |
|---|---|---|---|---|
| 5,257,247 | A | 10/1993 | Miche et al. | |
| 2013/0100782 | A1 | 4/2013 | Cattaneo et al. | |
| 2015/0241846 | A1 | 8/2015 | Briswalter et al. | |
| 2019/0137936 | A1 * | 5/2019 | Podvin | G04B 37/088 |

FOREIGN PATENT DOCUMENTS

| | | | |
|---|---|---|---|
| CH | 714 989 | A2 | 11/2019 |
| CN | 104769511 | A | 7/2015 |
| JP | 47-30234 | A | 8/1972 |
| JP | 6-27254 | A | 2/1994 |
| JP | 2013-525802 | A | 6/2013 |
| JP | 2015-531875 | A | 11/2015 |
| WO | 2014/067743 | A1 | 5/2014 |

OTHER PUBLICATIONS

European Search Report for 20 17 9344 dated Dec. 18, 2020.

* cited by examiner

*Primary Examiner* — Renee S Luebke
*Assistant Examiner* — Matthew Hwang
(74) *Attorney, Agent, or Firm* — Sughrue Mion, PLLC

(57) ABSTRACT

A sealing device (100) for a watch (200) configured to be inserted into a primary space (201) comprised in a middle part (210). The sealing device (100) includes an insertion organ (110) configured to be inserted into the primary space (201), a first sealing elements set (120) configured to seal the primary space (201) between the middle part (210) and the insertion organ (110), and a sealing elements set (140) configured to seal a secondary space (131) between a drive organ (130) and the insertion organ (110).

11 Claims, 1 Drawing Sheet

SEALING DEVICE

CROSS-REFERENCE TO RELATED APPLICATIONS

This application claims priority to European Patent Application No. 20179344.5 filed Jun. 10, 2020, the entire contents of which are incorporated herein by reference.

TECHNICAL FIELD

The present invention relates to a sealing device for a watch allowing to seal at high pressures.

TECHNOLOGICAL BACKGROUND

Current watch crowns are designed for a certain depth. Beyond this depth, it is difficult to guarantee the sealing of the watch because of the strong pressures exerted on the different parts of the watch and in particular on the crown.

Moreover, the sealing systems on the market do not satisfy diving enthusiasts or professional divers because, as mentioned above, sealing is not guaranteed on the one hand, or when sealing is ensured this is to the detriment of the handling of the crown which cannot be easily operated.

SUMMARY OF THE INVENTION

The present invention relates to a sealing device for a watch, preferably of a watch; said sealing device being configured to be inserted into a primary space comprised in a middle part; said sealing device comprising at least one:

- Insertion organ; said at least one insertion organ being configured to be inserted into said primary space;
- First sealing elements set; said at least one first sealing elements set configured to seal said primary space between said middle part and said at least one insertion organ;
- Driving organ; said at least one driving organ comprising a secondary space configured to receive said at least one insertion organ;
- Second sealing elements set; said at least one second sealing elements set being configured to seal said secondary space between said at least one drive organ and said at least one insertion organ.

Thanks to this arrangement, the sealing device allows to seal the watch, more particularly said primary space between said middle part and said at least one insertion organ, and said secondary space between said at least one drive organ and said at least one insertion organ, for high pressures such as, for example, less than 1500 bars.

According to one embodiment, said at least one first sealing elements set comprises at least one first sealing element and/or at least one first obstruction organ.

According to one embodiment, said at least one first obstruction organ is harder than said at least one first sealing element.

According to one embodiment, said at least one first sealing element is a first sealing gasket.

According to one embodiment, said at least one first obstruction organ is configured to limit all or part of the displacement of said at least one first sealing element in said primary space, preferably to obstruct said displacement of said at least one first sealing element in said primary space.

According to one embodiment, said primary space comprises a first primary volume, wherein said at least one first obstruction organ and said at least one first sealing element are located, and a second primary volume; said at least one first obstruction organ is configured to limit, preferably to obstruct, all or part of the displacement of said at least one first sealing element from said first primary volume to said second primary volume.

Thanks to either one of these preceding arrangements, said primary space becomes sealed for high pressures such as, for example, less than 1500 bars.

According to one embodiment, said at least one drive organ comprises a cavity configured to house said at least one second sealing elements set. According to one embodiment, said cavity is a groove inside said at least one drive organ.

Thanks to either one of these preceding arrangements, said at least one second sealing elements set is housed in said secondary space in said at least one drive organ without hindering the movements of said at least one insertion organ.

According to one embodiment, said at least one second sealing elements set comprises at least one second sealing element and/or at least one second obstruction organ.

According to one embodiment, said at least one second obstruction organ is harder than said at least one second sealing element.

According to one embodiment, said at least one second sealing element is a second sealing gasket.

According to one embodiment, said at least one second obstruction organ is configured to limit all or part of the displacement of said at least one second sealing element in said secondary space, preferably to obstruct said displacement of said at least one second sealing element in said secondary space.

According to one embodiment, said secondary space comprises a first secondary volume, wherein said at least one second obstruction organ and said at least one second sealing element are located, and a second secondary volume; said at least one second obstruction organ is configured to limit, preferably to obstruct, all or part of the displacement of said at least one second sealing element from said first secondary volume to said second secondary volume.

According to one embodiment, said cavity, preferably said groove, is located in said first secondary volume of said at least one drive organ.

Thanks to either one of these preceding arrangements, said secondary space becomes sealed for high pressures such as, for example, less than 1500 bars.

According to one embodiment, said at least one first sealing element and said at least one second element are closer to each other than said at least one first obstruction organ and said at least one second obstruction organ.

Thanks to this arrangement, said at least one first and second sealing element are the first on the water infiltration path.

According to one embodiment, said at least one drive organ being configured to be held in at least one first position, to drive in said at least one second position and to displace or be displaced between at least one first position and at least one second position.

Thanks to this arrangement, said at least one drive organ can be held.

According to one embodiment, said sealing device comprises at least one holding organ configured to hold said at least one drive organ in said at least one first position.

According to one embodiment, said at least one holding organ comprises at least one holding element disposed on said at least one insertion organ and at least one holding part disposed on said at least one drive organ; said at least one holding element being configured to removably cooperate with said at least one holding part.

According to one embodiment, said at least one insertion organ is configured to displace said at least one drive organ when said at least one holding element cooperates with said at least one holding part.

According to one embodiment, said at least one holding element is a tapping or a thread disposed on the inner periphery of said at least one insertion organ and said at least one holding part is a thread or a tapping disposed on the outer periphery of said at least one drive organ.

According to one embodiment, said at least one insertion organ has a hollow cylindrical shape, preferably is a tube, and said at least one drive organ comprises, preferably inside said secondary space, at least one sliding member configured to slide in said hollow cylindrical shape, preferably in said tube.

According to one embodiment, said at least one holding element is opposite said at least one holding part, preferably, said at least one holding element is disposed on an inner periphery of said at least one insertion organ and said at least one holding part is disposed on an outer periphery of said at least one drive organ.

According to one embodiment, said at least one holding element is opposite said at least one holding part, preferably, said at least one holding element is disposed on an inner periphery of said hollow cylindrical shape, preferably of said tube, and said at least one holding part is disposed on an outer periphery of said at least one sliding member.

Thanks to either one of these preceding arrangements, said at least one drive organ can be held in said at least one first position, and displace or be displaced between said at least one first position and said at least one second position.

According to one embodiment, said at least one insertion organ comprises a bearing surface configured to contact said at least one second sealing element with said at least one second obstruction organ when said at least one drive organ is held in said at least one first position.

Thanks to this arrangement, said at least one second sealing element can be contacted with said at least one second obstruction organ when said at least one drive organ is held in said at least one first position.

According to one embodiment, said sealing device comprises a return organ configured to seal said secondary space between said at least one drive organ and said at least one insertion organ and/or to compensate for a clearance of said at least one holding organ.

Thanks to this arrangement, said return organ can compensate for said clearance induced by the construction tolerances of said at least one holding organ and thus seal said secondary space between said at least one drive organ and said at least one insertion organ.

According to one embodiment, said at least one insertion organ comprises an abutment organ configured to abut against the middle part and/or against said at least one drive organ.

Thanks to this arrangement, said abutment organ allows to limit the insertion of said at least one insertion organ into said primary space and/or the displacement of said at least one drive organ when said at least one drive organ is in said second position.

According to one embodiment, said at least one insertion organ comprises a support organ configured to support said at least one first sealing elements set.

Thanks to this arrangement, said support organ allows to limit the displacement of said at least one first sealing elements set during high pressures such as, for example, less than 1500 bars.

According to one embodiment, said at least one first sealing elements set is comprised between said support organ and said abutment organ.

Thanks to this arrangement, said support organ allows to limit the displacement of said at least one first sealing elements set during high pressures such as, for example, less than 1500 bars.

The present invention relates to a watch configured to be sealed comprising a sealing device according to the present invention.

Thanks to this arrangement, the watch is sealed thanks to said sealing device, which allows to seal said primary space between said middle part and said at least one insertion organ, and said secondary space between said at least one drive organ and said at least one insertion organ, for high pressures such as, for example, less than 1500 bars.

BRIEF DESCRIPTION OF THE FIGURES

The invention will be described in more detail below using the appended drawings, given by way of non-limiting examples, wherein.

DETAILED DESCRIPTION OF THE INVENTION

Figure 1B:
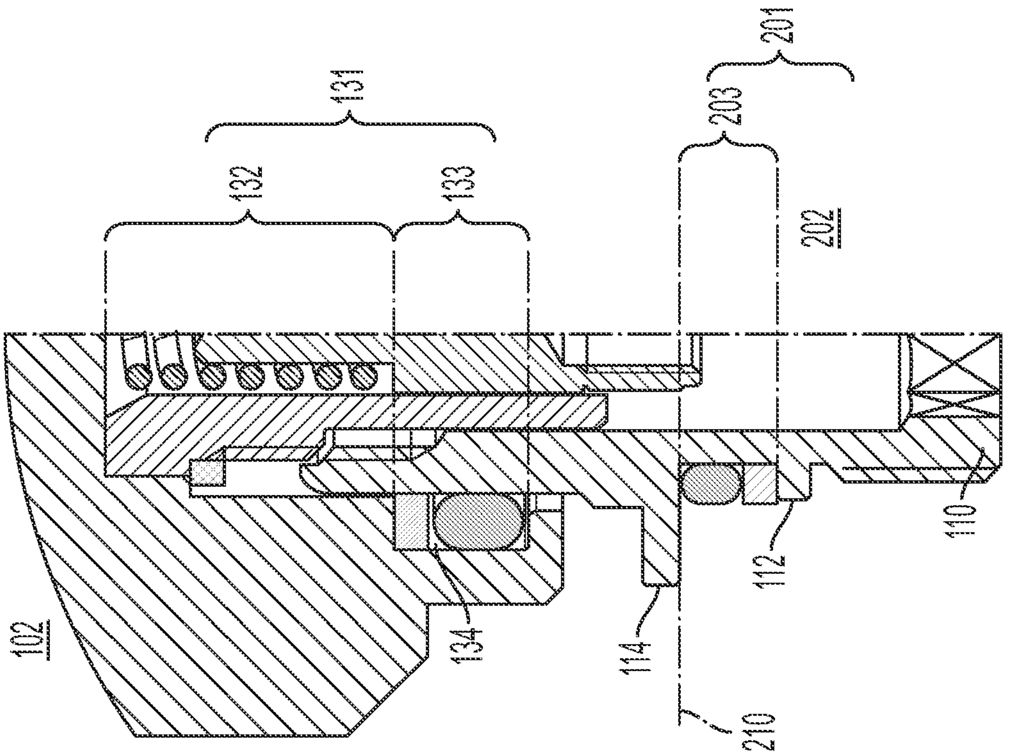
FIG. 1A illustrates a sealing device 100 for a watch 200 in at least one first position 101; and, FIG. 1B illustrates a sealing device 100 fora watch 200 in at least one second position 102.

Current watch crowns offer a certain sealing. However, when it comes to high pressure, for example above 300 bars, this sealing is ensured to the detriment of the handling of the crown, which cannot be easily operated.

This is not the case with the watch 200, according to the invention, which is sealed for these high pressures thanks to a sealing device 100. Indeed, said sealing device 100 for a watch 200, preferably of a watch 200 is configured to be inserted into a primary space 201 comprised in a middle part 210 of said watch 200 and comprises at least one insertion organ 110, at least one first sealing elements set 120, said at least one second set sealing elements 140, and at least one drive organ 130.

Figure 1A:
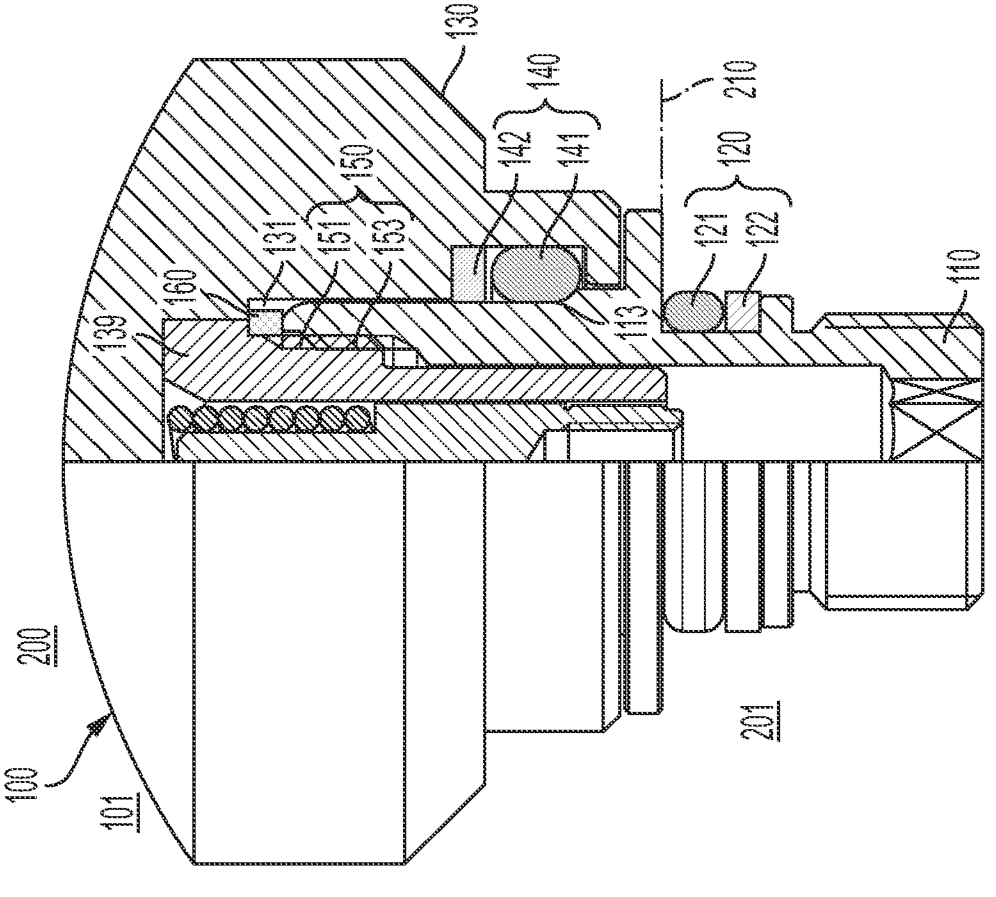

The latter, that is to say said at least one drive organ 130 can be held in at least one first position 101, observable in FIG. 1A, and can drive in said at least one second position 102, visible in FIG. 1B. Said at least one drive organ 130 can displace or be displaced between said at least one first position 101, visible in FIG. 1A, and said at least one second position 102, visible in FIG. 1B.

This holding in said at least one first position 101 is allowed via at least one holding organ 150. Said at least one holding organ 150 comprises at least one holding element 151 disposed on said at least one insertion organ 110 configured to removably cooperate with at least one holding part 153 disposed on said at least one drive organ 130. Said at least one insertion organ 110 is configured to displace said at least one drive organ 130 when said at least one holding element 151 cooperates with said at least one holding part 153.

More specifically, said at least one holding element 151 is a tapping or a thread disposed on the inner periphery of said at least one insertion organ 110 and is opposite said at least one holding part 153 which may take the form of a thread or a tapping disposed on the outer periphery of said at least one drive organ 130.

Indeed, said at least one insertion organ 110 has a hollow cylindrical shape, preferably is a tube, and said at least one drive organ 130 comprises, preferably totally or partially inside a secondary space 131 comprised by said at least one drive organ 130, at least one sliding member 139 configured to slide in said hollow cylindrical shape, preferably in said tube.

Visible in the FIGURES, said at least one holding element 151 is opposite said at least one holding part 153, preferably, said at least one holding element 151 is disposed on an inner periphery of said hollow cylindrical shape, preferably of said tube, and said at least one holding part 153 is disposed on an outer periphery of said at least one sliding member 139 so that said at least one drive organ 130 can be held in said at least one first position 101, and displace or be displaced between said at least one first position 101 and said at least one second position 102.

As mentioned above, said middle part 210 of said watch 200 comprises said primary space 201 into which said at least one insertion organ 110 is inserted. An abutment organ 114, comprised by said at least one insertion organ 110, allows to abut against the middle part 210, when said at least one insertion organ 110 is inserted, and/or against said at least one drive organ 130 and thus limit the insertion of said at least one insertion organ 110 into said primary space and/or the displacement of said at least one drive organ 130 when said at least one drive organ 130 is in said first position 101. Moreover, when said at least one drive organ 130 is in said first position 101, the contact made between said at least one drive organ 130 and said abutment organ 114, the sealing between said secondary space 131 and said at least one drive organ 130 is thereby improved.

Said at least one drive organ 130, in turn, comprises a secondary space 131 configured to receive said at least one insertion organ 110. A cavity 134, preferably a groove 134 inside said at least one drive organ 130, allows to house said at least one second sealing elements set 140 and thus to seal said secondary space 131 between said at least one drive organ 130 and said at least one insertion organ 110.

As visible in FIG. 1A, said at least one second sealing elements set 140 comprises at least one second sealing element 141, preferably a second gasket 141, and/or at least one second obstruction organ 142: said at least one second obstruction organ 142 being harder than said at least one second sealing element 141. Said at least one second obstruction organ 142 is configured to limit all or part of the displacement of said at least one second sealing element 141 in said secondary space 131, preferably to obstruct said displacement of said at least one second sealing element 141 in said secondary space 131.

Observable in FIGS. 1A and 1B, said secondary space 131 comprises a first secondary volume 133, comprising said cavity 134, preferably said groove 134, and wherein said at least one second obstruction organ 142 and said at least one second sealing element 141 are located, and a second secondary volume 132. Said at least one second obstruction organ 142 is configured to limit, preferably to obstruct, all or part of the displacement of said at least one second sealing element 141 from said first secondary volume 133 to said second secondary volume 132.

Moreover, said at least one insertion organ 110 comprises a bearing surface 113 configured to contact said at least one second sealing element 141 with said at least one second obstruction organ 142 when said at least one drive organ 130 is held in said at least one first position 101 so that said at least one second sealing element 141 can be contacted with said at least one second obstruction organ 142 when said at least one drive organ 130 is held in said at least one first position 101.

Still visible in FIGS. 1A and 1B, said sealing device 100 comprises a return organ 160 configured to seal said secondary space 131 between said at least one drive organ 130 and said at least one insertion organ 110 and/or to compensate for a clearance of said at least one holding organ 150 so as to compensate for said clearance induced by the construction tolerances of said at least one holding organ 150, when said at least one drive organ 130 is held in said first position 101, and thus to seal said secondary space 131 between said at least one drive organ 130 and said at least one insertion organ 110.

Said at least one first sealing elements set 120, configured to seal said primary space 201, is located, preferably on said at least one insertion organ 110, between said middle part 210 and said at least one insertion organ 110, and comprises at least one first sealing element 121, preferably a first gasket 121, and/or at least one first obstruction organ 122: said at least one first obstruction organ 122 being harder than said at least one first sealing element 121.

As can be seen from the FIGURES, said at least one first sealing element 121 and said at least one second element are closer to each other than said at least one first obstruction organ 122 and said at least one second obstruction organ 142 so that said at least one first and second sealing element 141 are the first on the water infiltration path.

Said at least one first obstruction organ 122, in turn, is configured to limit all or part of the displacement of said at least one first sealing element 121 in said primary space 201, preferably to obstruct said displacement of said at least one first sealing element 121 in said primary space 201. Indeed, said primary space 201 comprises a first primary volume 203 comprising said at least one first obstruction organ 122 and said at least one first sealing element 121, and a second primary volume 202. Said at least one first obstruction organ 122 is configured to limit, preferably to obstruct, all or part of the displacement of said at least one first sealing element 121 from said first primary volume 203 to said second primary volume 202 so as to make said primary space 201 sealed for high pressures such as, for example, less than 1500 bars.

To this is added, according to the embodiments, a support organ 112, comprised by said at least one insertion organ 110, to support said at least one first sealing elements set 120, in order to increase the limitation of the displacement of said at least one first sealing elements set 120 during high pressures such as, for example, less than 1500 bars. Indeed, said at least one first sealing elements set 120 is comprised between said support organ 112 and said abutment organ 114.

Of course, the sealing device 100 allows to seal the watch 200, more particularly said primary space 201 between said middle part 210 and said at least one insertion organ 110, and said secondary space 131 between said at least one drive organ 130 and said at least one insertion organ 110, for high pressures such as, for example, less than 1500 bars.

The invention claimed is:

1. A sealing device for a watch, said sealing device being configured to be inserted into a primary space in a middle part, said sealing device comprising:

an insertion organ configured to be inserted into said primary space;

a first sealing elements set configured to seal said primary space between said middle part and said insertion organ;

a drive organ comprising a secondary space configured to receive said insertion organ; and a second sealing elements set configured to seal said secondary space between said drive organ and said insertion organ, wherein said first sealing elements set comprises a first sealing element and a first obstruction organ, wherein said second sealing elements set comprises a second sealing element and a second obstruction organ, and wherein said first sealing element and said second sealing element are closer to each other than said first obstruction organ and said second obstruction organ are to each other.

2. The sealing device according to claim 1, wherein said drive organ comprises a cavity configured to house said second sealing elements set.

3. The sealing device according to claim 1, wherein said drive organ is configured to be held in a first position, to drive in a second position and to displace or be displaced between said first position and said second position.

4. The sealing device according to claim 3, further comprising a holding organ configured to hold said drive organ in said first position.

5. The sealing device according to claim 4, wherein said holding organ comprises a holding element disposed on said insertion organ and a holding part disposed on said drive organ, said holding element being configured to removably cooperate with said holding part.

6. The sealing device according to claim 1, wherein said insertion organ comprises a bearing surface configured to contact said second sealing element with said second obstruction organ when said drive organ is held in a first position.

7. The sealing device according to claim 1, further comprising a return organ configured to seal said secondary space between said drive organ and said insertion organ and/or to compensate for a clearance of said holding organ.

8. The sealing device according to claim 1, wherein said insertion organ comprises an abutment organ configured to abut against the middle part and/or against said drive organ.

9. The sealing device according to claim 8, wherein said insertion organ comprises a support organ configured to support said first sealing elements set.

10. The sealing device according to claim 9, wherein said first sealing elements set is comprised between said support organ and said abutment organ.

11. A watch configured to be sealed comprising a sealing device according to claim 1.

* * * * *